United States Patent [19]

Parker et al.

[11] 3,724,393
[45] Apr. 3, 1973

[54] RESILIENTLY BIASED PILOT AXLE ARRANGEMENT

[76] Inventors: John Henry Parker, 730 Saint Aubin Street, Saint Laurent, Quebec; F. Thomas McInerney, III, 190 de Normandie Saint Bruno, Quebec, both of Canada

[22] Filed: Feb. 11, 1971

[21] Appl. No.: 114,656

[52] U.S. Cl..................................105/174, 105/136
[51] Int. Cl..............B61f 3/02, B61f 5/30, B61f 5/38
[58] Field of Search......................105/136, 172, 174

[56] References Cited

UNITED STATES PATENTS

| | | | |
|---|---|---|---|
| 2,994,284 | 8/1961 | Travilla | 105/174 |
| 227,029 | 4/1880 | Mason | 105/174 X |
| 3,115,100 | 12/1963 | Janeway | 105/174 |
| 2,349,568 | 5/1944 | Travilla, Jr. | 105/174 |

*Primary Examiner*—Gerald M. Forlenza
*Assistant Examiner*—Howard Beltran
*Attorney*—Alan Swabey

[57] ABSTRACT

A railway vehicle truck having a frame provided with a plurality of spaced apart wheel supporting driven axles and a resiliently biased front pilot axle assembly. The front idle axle assembly comprises a pilot axle housing for supporting a pilot axle having a wheel at each end thereof. The pilot axle housing is connected to the frame by precompressed elastomer blocks interposed between the frame and the pilot axle housing. The precompressed elastomer blocks permit smooth guided movement of the pilot axle housing in an arcuate horizontal plane and in the vertical plane.

13 Claims, 3 Drawing Figures

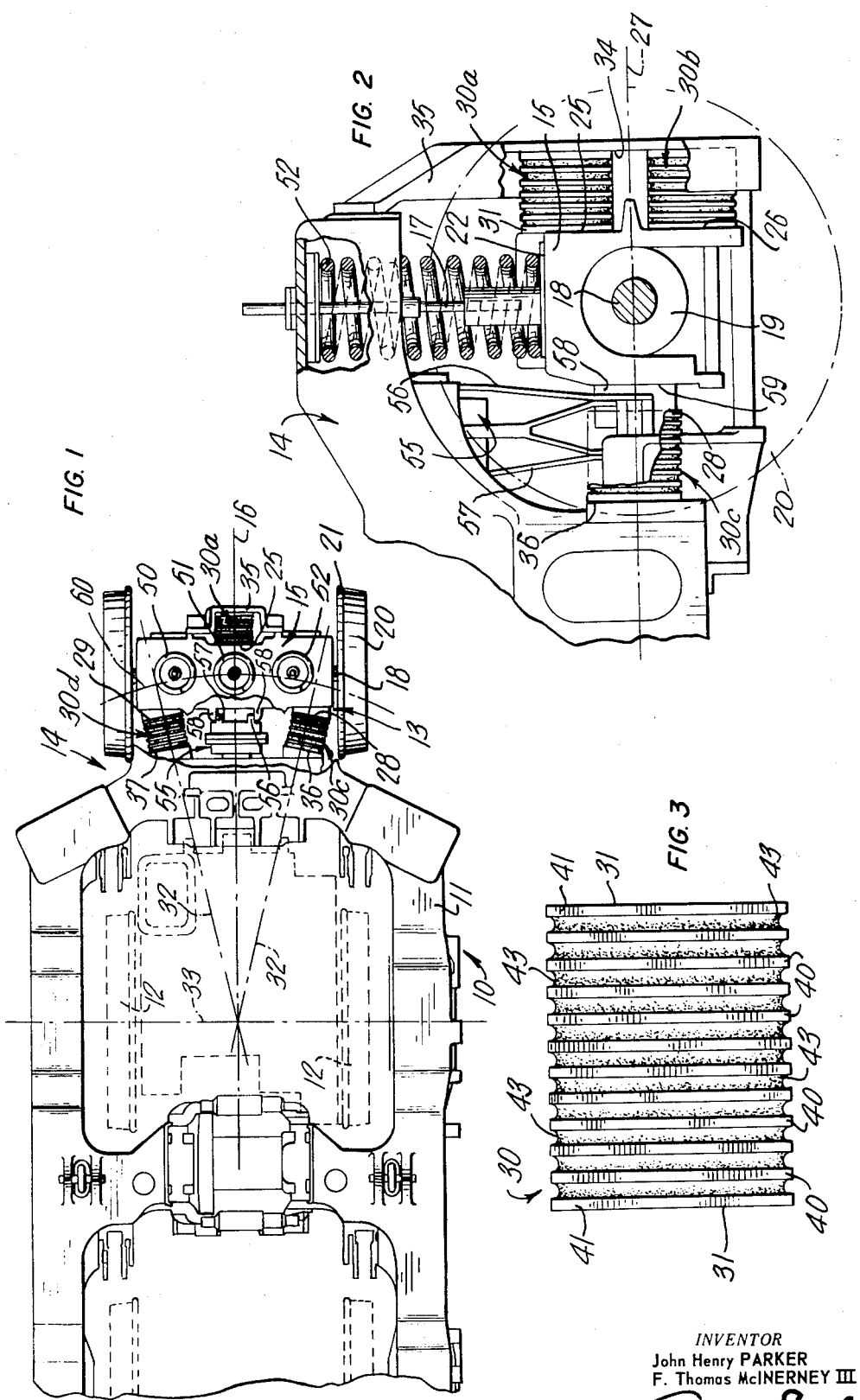

RESILIENTLY BIASED PILOT AXLE ARRANGEMENT

BACKGROUND OF THE INVENTION a. Field of the Invention

This invention relates to a pilot axle assembly suspension for a motorized truck for locomotive or the like powered vehicles.

b. Description of Prior Art

Motorized trucks for locomotives or the like powered vehicles normally comprise a plurality of motorized axles having a flange wheel at each end thereof, for supporting the vehicle on rails. During operation and more particularly when the vehicle has to follow curved rails, the wheel flanges of the wheels of the front axle are subjected to considerable wear because of the lateral force applied to the flange by the curve track section. The force exerted on the flange is also transmitted to the front axle which is also subjected to some of the stress. Further, with a rigid front axle the wheels have a tendency to climb and jump the rails when entering a curve rail section as the trailing powered wheels of the locomotive tend to push the vehicle straight ahead as these further wheels have not yet entered the curve rail section.

These problems have been greatly reduced by the provision of a front pivoted pilot axle which will assist the trailing powered wheels to follow curve rail sections. However, these further wheels are still subjected to a certain amount of force or stress between the flange of its wheels and the outside rail of the curved rail section. This force, as mentioned hereinabove causes wear of the wheel flange and also of the rails and further transmit a certain stress to their respective axle. Still further, many of the front pivotal pilot axle arrangements heretofore constructed employ linkage structures having link arms, pins and bushings connecting the pilot wheels to the truck frame. This type of arrangement requires periodic servicing and replacement of parts.

SUMMARY OF INVENTION

It is an object of the present invention to provide a pilot wheel suspension for a motorized truck for locomotives or the like powered vehicles which substantially reduces the above-mentioned disadvantages.

Accordingly, from one aspect, the present invention provides a railway vehicle truck having a frame provided with a plurality of spaced apart wheel supporting driven axles and a front pilot axle assembly. The front pilot axle assembly is provided with means for supporting a pair of wheels and including precompressed resilient means interposed between the pair of wheels and the truck frame. The precompressed resilient means permits smooth guided movement between the pair of wheels and the frame in a plurality of planes.

BRIEF DESCRIPTION OF DRAWINGS

The invention is illustrated, by way of example, with reference to the embodiment shown by the accompanying drawings in which:

FIG. 1 is a top plan view, partly fragmented, of a truck frame assembly;

FIG. 2 is a side view, partly fragmented, of the pilot idle wheel assembly; and

FIG. 3 is a side view of an elastomer spring element.

DESCRIPTION OF PREFERRED EMBODIMENTS

Referring now to the drawings, and more specifically to FIG. 1, there is shown, generally at 10, a truck frame assembly for supporting a locomotive or the like vehicle, not shown. The truck frame assembly 10 comprises a truck frame 11 having a plurality of powered wheels 12 supported in spaced relationship therealong. At the front end of the truck frame 11 there is provided a pilot idle wheel assembly 13 for guidance of the truck frame 11. The assembly 13 is retained for axial and vertical movement with the front end 14 of the truck frame 11.

With additional reference to FIGS. 2 and 3 of the drawings, it can be seen that the pilot idle wheel assembly comprises a horizontal, substantially elongated, pilot axle housing 15 held transverse to the longitudinal center line 16 of the truck frame 11. An unpowered axle 18 is supported by bearings 19 journaled at each end of the pilot axle housing 15. A wheel 20 having an inner side flange 21 is secured for rotation at each end of the idle axle 18. The pilot axle housing 15 is held between a plurality of elastomer elements or elastomer blocks 30a, 30b, 30c and 30d. The upper face 22 of the pilot axle housing 15 supports one end of a set of compression springs 50, 51 and 52, located on the transverse center of the housing. The other end of the set of compression springs 50, 51 and 52 support the front end 14 of the truck frame 11. A vertical limit stop device 17 is secured to the upper face 22 of the pilot axle housing 15 and to the truck frame front end 14 to limit downward displacement of the compression springs 50, 51 and 52 which are exerting a downward pressure. The axle housing 15 is further held between a plurality of resilient means in the form of elastomer blocks 30 (see FIG. 3) which consists essentially of a plurality of flat intermediate metal plates 40 (hereinshow ten plates) disposed between the end plates 41 and positioned in alternating series with a plurality of elastomer elements 43. The elastomer elements 43 have flat faces for bonding by such means as vulcanizing between the metal plates 40 and the end plates 41. The elastomer blocks 30 may be of various harness and also may have perforations therein to modify their elastic or resilient properties. The elastomer blocks 30 have an indefinite life because of their constructions employing substantially nonwearing parts and require no lubrication. Also, these blocks are resistant to many environmental elements such as grease, water, frost, etc., and therefore needs substantially no servicing.

The axle housing 15 is provided with two bearing surfaces 25 and 26 disposed in a vertical plane in the front face thereof to receive the abutting surface 31 of the end plate 41 of a respective elastomer block 30 herein referred to as the front pair of elastomer blocks 30a and 30b. Each of the elastomer blocks 30a and 30b of the front pair are symmetrically spaced-apart, one on each side of the central horizontal plane 27 of the idle axle 18 and each centered on the longitudinal center line 16 of the truck frame 11. Elastomer blocks 30a and 30b are held in compression between the bearing surfaces 25 and 26, and the inner face 34 of a clamp plate 35. The clamp plate 35 is held rigidly vertically in the front portion 14 of the truck frame 11 in front of the pilot axle housing 15.

Further bearing faces 28 and 29 are provided on the rear face of the axle housing 15, one near each end thereof, and are disposed in a vertical plane facing angularly inwardly towards the longitudinal center line 16 so that the central longitudinal axis 32 of the rear pair of elastomer blocks 30c and 30d, resting thereon, intersect with the longitudinal center line 16 to provide an ideal angular displacement of the pilot axle in a freely guided arcuate horizontal plane. The rear pair of elastomer blocks 30c and 30d are also held in compression between their end plates by respective angularly disposed bearing surfaces 36 and 37 provided in the front end of the truck frame 11 and bearing surfaces 28 and 29 on the rear face of the pilot axle housing 15. Bearing surfaces 36 and 37 lie parallel to bearing surfaces 28 and 29.

Mounted between the front end of the truck frame 11 and the pilot axle housing 15 is a centering device 55. The centering device 55 consists of two metallic arms 56 and 57 secured respectively of an inner and outer metallic sleeve (not shown), the sleeves being interconnected by an elastomer core (not shown). In the installed state, the arms 56 and 57 are displaced angularly toward each other, thus causing a stress in the rubber and thus an outward force at the ends of the arms 56 and 57. The arms 56 and 57 are held in a spaced together position and equidistantly on a respective side of the center line 16 by two tongues (not shown) formed integrally with the front end of the truck frame 11. Two further tongues 58 are located on the rear face 59 of the pilot axle housing 15 and positioned symmetrically about the center line 16 and spaced apart to align with the tongues on the truck frame 11, and thus with the ends of the arms 56 and 57. It will be recognized by those skilled in the art that this arrangement constitutes a pre-load at the center position of the pilot axle assembly such that a force at the flange 21 will not displace the pilot axle assembly until said force exceeds the force being exerted against the tongues on the truck frame 11 by the arms of the centering device. It will be recognized that all of the elastic elements vis. the compression springs, elastomer blocks, and centering device, all contribute to the total restoring force. The proper combination of all rates and pre-load setting of the centering device is fundamental to the design in securing the proper guidance from the pilot axle assembly. Thus, when the pilot axle housing is axially displaced, a restoring force of the desired magnitude is provided by the aforementioned elastic elements to assist in guiding the frame 11 and thus the motorized axles so that the pilot axle and following motorized axles each assume respectively the desired proportion of the required curve negotiating flange force.

In operation, as the pilot idle axle assembly 13 enters a curvate rail section (for purpose of description we will assume that the rail section curves to the left of the front end of the truck frame 11 as shown in FIG. 1) a force is applied to the flange 21 of the right wheel 20 by the outside right rail (not shown). This force is transmitted to the idle axle 18 and when said force exceeds the pre-load provided by the centering device 55, the axle housing 15 is displaced in a guided arcuate horizontal plane 60 which is predetermined by the disposition of the elastomer pads.

The rear elastomer blocks 30c and 30d are positioned with their central perpendicular axis 32 lying in the same plane as the radius of the arcuate plane 60. The elastomer blocks 30a, 30b, 30c and 30d are further precompressed between their associated bearing surfaces. When the blocks 30 are compressed longitudinally they offer a very stiff resistance. The blocks 30 are sufficiently compressed to shear at the maximum arcuate or vertical displacement.

It is within the ambit of the present invention to provide a single elastomer block between the front vertical face of the axle housing and the front clamp plate. However, such elastomer block may be made substantially larger. Also, further modifications will be evident to those skilled in the art without departing from the scope of the invention as set forth in the appended claims.

We claim:

1. In a railway vehicle truck having a frame provided with a plurality of spaced apart wheel supporting driven axles and a front pilot axle assembly; said front pilot axle assembly having a pilot axle housing for supporting a pair of wheels; said assembly including precompressed resilient means located between said housing and said truck frame and fore and aft of said housing; said precompressed resilient means permitting predetermined constrained movement of said housing in vertical and horizontal planes.

2. A railway vehicle truck as claimed in claim 1 wherein said elastomer blocks each comprise two metallic end plates having a plurality of elastomer elements and intermediate metal plates bonded in alternating series between said two metallic end plates.

3. In a railway vehicle truck having a frame provided with a plurality of spaced apart wheel supporting driven axles and a front pilot axle assembly; said front pilot axle assembly comprising a pilot axle housing supporting a pilot axle having a wheel at each end thereof, said pilot axle housing being connected to said frame by precompressed elastomer blocks interposed between said frame and said pilot axle housing and fore and aft of said housing; said precompressed elastomer blocks permitting predetermined constrained movement of said pilot axle housing in an arcuate horizontal plane and in the vertical plane.

4. A railway vehicle truck as claimed in claim 3 wherein said elastomer blocks associated with said two inclined bearing surfaces are each maintained in precompression between its respective one of said inclined bearing surface in said axle housing and a further inclined bearing surface formed integrally in the front of said truck frame, said bearing surfaces at each end of a respective elastomer block being disposed parallel to each other.

5. A railway vehicle truck as claimed in claim 3 wherein two bearing surfaces are provided in the front face of said axle housing and positioned to support a respective elastomer block, each said elastomer block being symmetrically spaced apart, one on each side of the central horizontal plane of said pilot axle and each centered on the longitudinal center line of said truck frame.

6. A railway vehicle truck as claimed in claim 3 wherein said pilot axle housing is provided with at least one bearing surface in the front face thereof extending in a vertical plane and adapted to receive in bearing contact therewith one end of at least one elastomer block disposed symmetrically on the truck longitudinal center line, and two inclined bearing surfaces respectively disposed in a vertical plane and symmetrically spaced apart on a respective side of the truck longitudinal center line, in the rear face of said pilot axle housing, each said inclined bearing surface adapted to receive in bearing contact therewith one end of a respective elastomer block.

7. A railway vehicle truck as claimed in claim 6 wherein said two inclined bearing surfaces are disposed angularly inwardly towards said truck longitudinal center line; the central longitudinal axis of each said elastomer spring element associated with said two bearing surfaces, intersecting with said center line inwardly of said truck frame.

8. A railway vehicle truck as claimed in claim 6 wherein said at least one elastomer block is maintained in precompression between said bearing surface in the front face of said axle housing and the inner face of a clamp plate held rigidly in a vertical plane in the front of said truck frame, said bearing surface and clamp plate inner face being disposed parallel to each other.

9. A railway vehicle truck as claimed in claim 6 wherein said precompressed elastomer blocks will shear when said pilot axle housing is displaced in a vertical plane or in an arcuate horizontal plane and retain a compression.

10. A railway vehicle truck as claimed in claim 6 wherein a plurality of precompressed helical springs are positioned above said pilot axle housing and maintained in compression with the top surface thereof and said truck frame by means of a limit stop device secured between said top surface and said truck frame.

11. A railway vehicle truck as claimed in claim 6 wherein a centering device is secured between said truck frame and said pilot axle housing, said centering device being adapted to exert a restoring force to said pilot axle housing when displaced axially to thereby restore said idle axle wheels in the same plane as said wheels secured to said driven axles.

12. A railway vehicle truck as claimed in claim 11 wherein a total restoring force is provided by the combination of the force exerted by said restoring device, the shear displacement of the ends of the vertical springs mounted on top of said axle housing and the force caused by the shear displacement of the elastomer blocks.

13. A railway vehicle truck as claimed in claim 11 wherein said centering device is arranged in a manner that the pilot axle is held centered until a preselected flange force is exceeded.

* * * * *